UNITED STATES PATENT OFFICE.

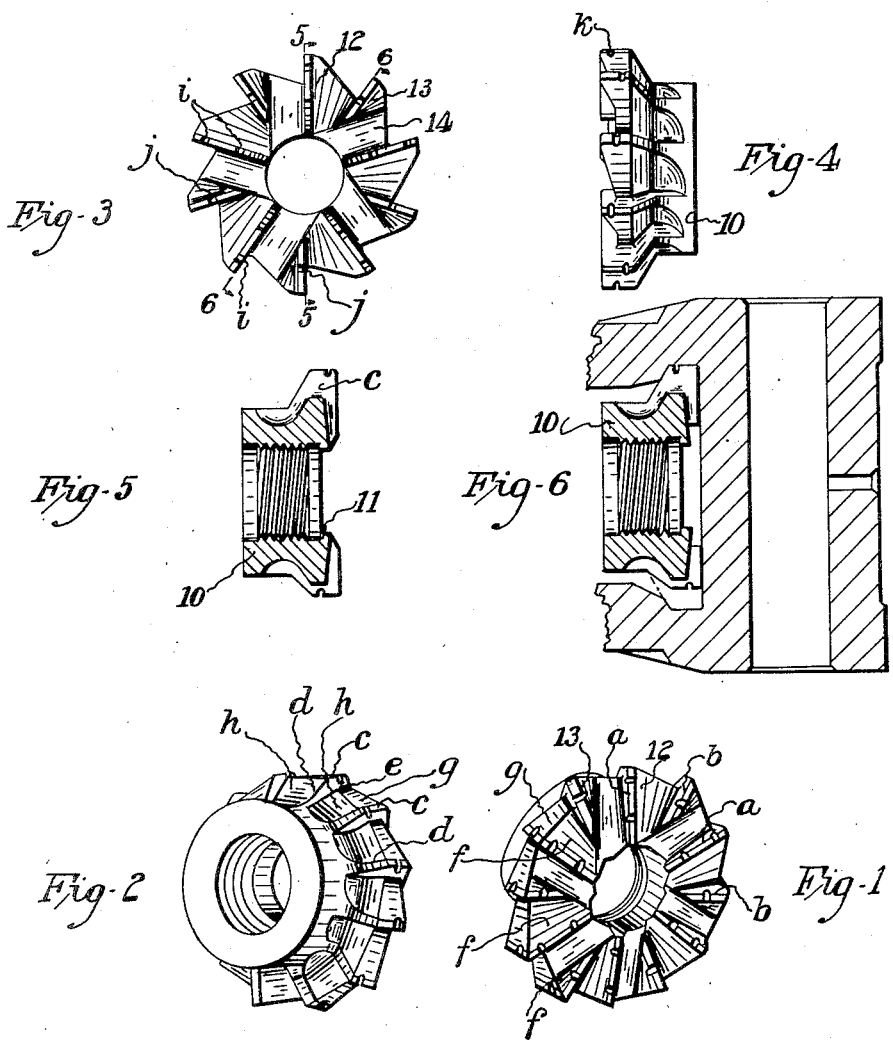

ROBERT T. POLLOCK, OF CAMBRIDGE, MASSACHUSETTS.

MILLING-CUTTER.

1,385,750.  Specification of Letters Patent.  Patented July 26, 1921.

Application filed May 12, 1919. Serial No. 296,371.

*To all whom it may concern:*

Be it known that I, ROBERT T. POLLOCK, a citizen of the United States, residing at Cambridge, in the county of Middlesex and State of Massachusetts, have invented new and useful Improvements in Milling-Cutters, of which the following is a specification.

In the manufacture of crank shafts for combustion engines, and especially those employed in aeroplanes, Hans H. Wanders disclosed in his copending application Serial No. 215,896, filed February 7, 1918, how the crank pins may be all simultaneously milled, thus reducing the time and cost of production. In certain of the engines, the crank shafts are of such limited length, owing to the engine design, that the crank arms at the end of each crank pin are in such relative proximity that it is desirable to cut a fillet or groove therein at the juncture of the pin and the arms.

The present invention has for its object to provide an improved milling cutter so constructed that it will diametrically reduce the crank pin and also form a fillet or groove in the opposing faces of the crank arm, and which may be employed in the machine disclosed in said application. In said machine, the milling cutter is mounted radially in an annular carrier which is caused to revolve about the axis of the stationarily-held crank pin, and by suitable power-transmitting mechanism the cutter is rotated upon its own axis during such revolution.

In accordance with the present invention, the cutter comprises a head having a plurality of teeth affording on its front face a series of cutting edges arranged to operate upon the crank pin, and on its periphery and on its rear face a series of cutting edges, for the purpose of cutting the groove or fillet in the crank arms.

On the drawing,—

Figures 1 and 2 are perspective views of the cutter, showing the front and rear thereof.

Fig. 3 represents a front elevation of the cutter.

Fig. 4 represents a side elevation thereof.

Figs. 5 and 6 represent sections on the lines 5—5 and 6—6 of Fig. 3.

The cutter consists of a head having a hub 10 which is shown as internally threaded so that it may be screwed upon an arbor or spindle, with an inwardly projecting flange 11. The head is provided with a series of alternating teeth 12 and 13, each tooth being so formed as to provide a radial cutting edge on the front of the head, what may be termed a peripheral cutting edge, and a rear cutting edge The front cutting edges are indicated at $a$ and $b$ respectively, the peripheral edges at $c$, and the rear edges at $d$. Each tooth has a flat face $e$, corresponding to a top rake, which terminates at the cutting edges and which is in a plane radial to the axis of the head. Behind each edge there is a clearance face, said clearance faces being indicated at $f$, $g$ and $h$, respectively. Each of these faces is at an acute angle to the associated flat face $e$. It may be noted that the front cutting edges all lie in a plane to which the axis of the head is perpendicular, so that they may form a perfect cylindrical surface upon the crank pin in diametrically reducing the same. Each of the rear cutting edges $d$ is at an acute angle to the associated front cutting edge $a$ or $b$, as the case may be, whereas the peripheral cutting edges are approximately parallel to the axis of the head. It is not material that the peripheral and rear cutting edges should be rectilinear, as they may be curved if desired, since the shape of these edges depends upon the desired cross-sectional shape of the groove to be formed in the crank arms of the crank shaft to be milled.

Looking at the cutter from the front, it will be seen that it is formed with a series of flat grooves 14, each of which is parallel to one of the front cutting edges $a$, and is therefore (considered as a whole) tangential to the axis of the cutter. Each groove cuts through the inner portion of the clearance face $f$ of a tooth 13, and reduces the length of the front cutting edge $b$ of such tooth, so that, whereas the edges $a$ are of full length, the edges $b$ extend radially inwardly from the periphery but a relatively short distance. The formation of the grooves insures ample clearance for the inner portions of the long edges $a$, and provides for the discharge of the chips and cuttings. For the purpose of dividing and breaking up the cuttings, the front cutting edges $a$ and $b$ have staggered notches $i$, $i$ and $j$ respectively, and the peripheral edges $c$ also have the notches $k$ which are out of alinement with each other.

Having thus explained the nature of my said invention and described a preferred form thereof, without attempting to set forth all of the forms in which it may be made or all of the modes of its use, what I claim is:

A milling cutter consisting of a head provided with a series of teeth forming front, peripheral and rear cutting edges, each tooth having a flat rake and clearance faces behind the three cutting edges thereof, and the front cutting edges lying in a plane to which the axis of the head is perpendicular, said head having grooves parallel to the front cutting edges of the alternate teeth and transecting the front cutting edges of the intervening teeth, substantially as described.

In testimony whereof I have affixed my signature.

ROBERT T. POLLOCK.